Jan. 22, 1957 T. J. SULLIVAN 2,778,917
ELECTRICAL SAFETY CONTROL APPARATUS
Filed March 22, 1954 3 Sheets-Sheet 1

INVENTOR
Timothy J. Sullivan
BY Pierce, Scheffler & Parker,
ATTORNEYS.

Jan. 22, 1957 T. J. SULLIVAN 2,778,917
ELECTRICAL SAFETY CONTROL APPARATUS
Filed March 22, 1954 3 Sheets-Sheet 2
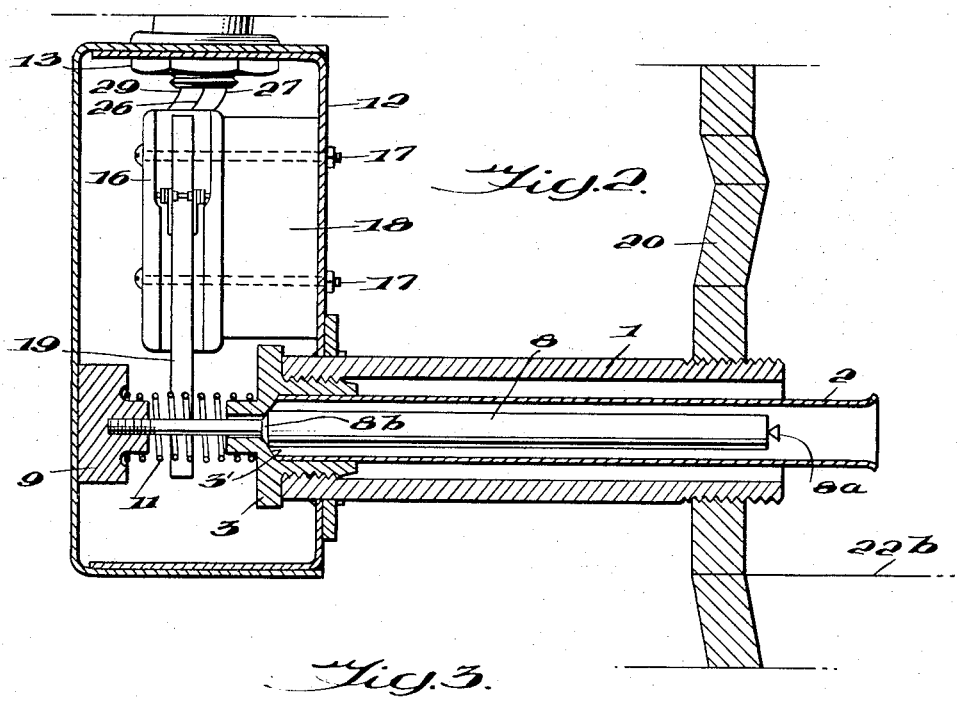
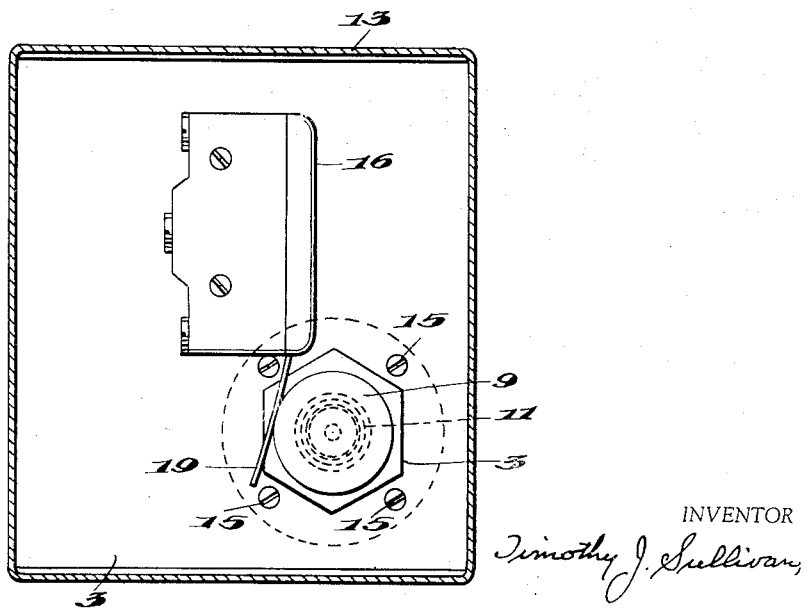
INVENTOR
Timothy J. Sullivan,
BY Pierce, Scheffler & Parker
ATTORNEYS Jan. 22, 1957 T. J. SULLIVAN 2,778,917
ELECTRICAL SAFETY CONTROL APPARATUS
Filed March 22, 1954 3 Sheets-Sheet 3

INVENTOR
Timothy J. Sullivan,
BY Pierce, Scheffler & Parker,
ATTORNEYS.

United States Patent Office
2,778,917
Patented Jan. 22, 1957

2,778,917

ELECTRICAL SAFETY CONTROL APPARATUS

Timothy J. Sullivan, Butte, Mont., assignor to Sullivan Valve and Engineering Company, Butte, Mont., a corporation of Montana Application March 22, 1954, Serial No. 417,862

5 Claims. (Cl. 219—38)

This invention relates to improvements in electrical safety control apparatus, and more particularly to safety apparatus responsive to abnormal heat conditions.

An object of this invention is to provide control apparatus which may be installed upon steam or water boilers to protect such boilers from overheating.

A further object is to provide control apparatus which will function upon the overheating of a boiler or heat transfer device as a safety control for cutting out the power circuit to the burner or any electrically driven firing apparatus therefor, or for cutting off the fuel supply thereto.

An additional object is to incorporate into such a control apparatus an auxiliary signal actuating circuit which may be employed to operate a safety alarm signal of audible or visual type.

As will become apparent from the more detailed description of preferred embodiments of my invention which follow, the safety control device includes a heat-responsive member for detecting over-temperature conditions due to low water-level in a boiler, and an electrical switching system which such member operates to shut down the boiler firing apparatus and at the same time to signal an alarm. The precise form of the heat-responsive member may vary to suit various boiler installations but, in all cases, the control apparatus is so arranged that the wiring for the electrical switching system need not be disconnected or disturbed when replacing or recycling the heat-responsive member after an over-temperature condition.

In the drawings, wherein like reference numerals indicate like parts:

Fig. 2 is a similar fragmentary section showing the control apparatus actuated in response to low water-level conditions;

Fig. 3 is a sectional view taken along line 3—3 of Fig. 1;

Figure 1:
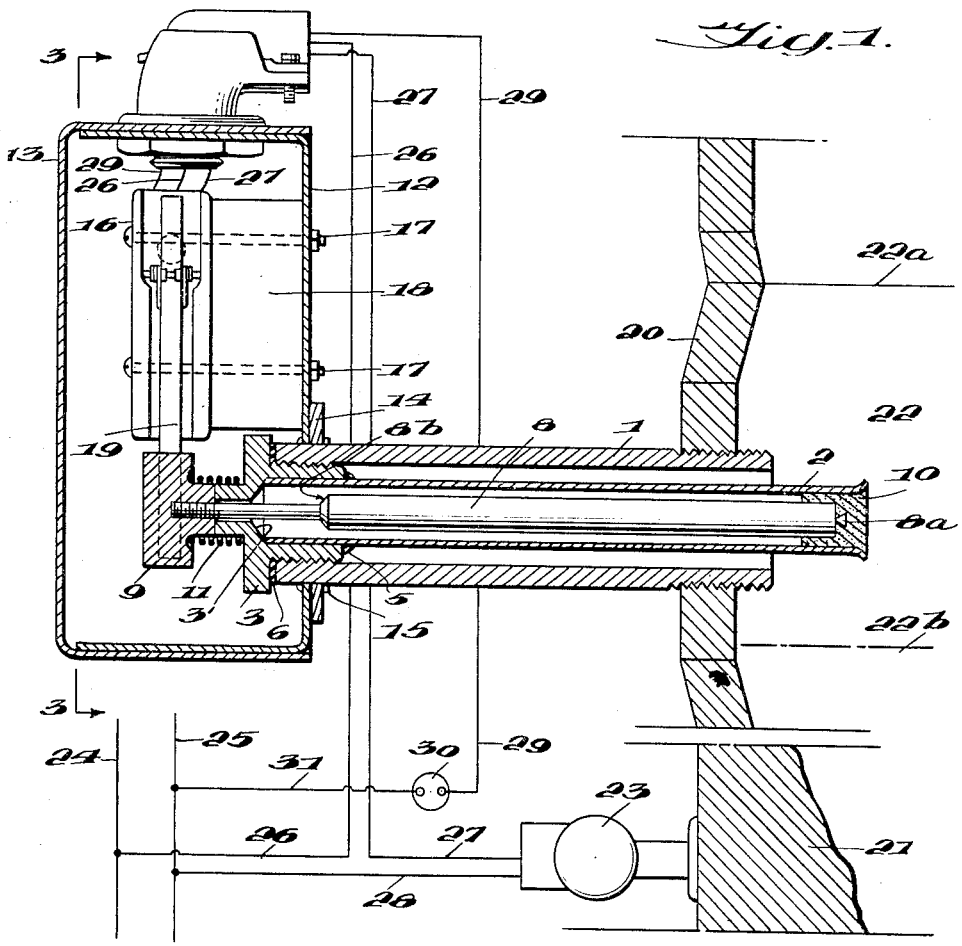
Fig. 1 is a fragmentary sectional side view of a boiler under normal water-level conditions equipped with one embodiment of the apparatus of this invention.

In Fig. 1, reference numeral 20 identifies a portion of the boiler wall of any conventional well known form of steam or water boiler 21 in which the level of the boiler water 22 may vary from the normal water-level indicated at 22a to an undesired abnormal low level 22b.

The control apparatus includes a boiler mounting tube 1 adapted to be secured in and to extend through boiler wall 20 at a location below level 22a and above level 22b. A replaceable tubular heat-responsive member 2 is mounted within tube 1 so as to extend into contact with the boiler water 22 at the minimum safe water-level that avoids overheating. Member 2 is positioned within tube 1 by means of tube nut 3 which encases the outer end of member 2 and is hermetically secured thereto by a brazed ring 5. A gasket 6 insures a liquidtight seal between elements 3 and 1. An actuating rod or shaft 8 is fitted within heat-responsive member 2 and is provided with an outer end of reduced diameter which extends axially through tube nut 3 and merges with the larger diameter inner end by a conical section 8b complementary to the bevel seat 3' at the inner face of the mounting nut 3. A knob 9 is threaded onto the outer end of rod 8, while the inner end thereof is normally secured against movement by a mass 10 of fusible material cast upon the small dovetail end 8a of the rod 8 and forming a plug closing the inner end of the tube 2. The fusible material 10 is preferably a solder alloy whose melting point may be suitably chosen to lie at a desired point within the temperature limits of 300 to 450 degrees Fahrenheit. A spring 11 is normally held in compression between the outer face of tube nut 3 and the inner face of knob 9 as shown in Fig. 1.

A switch housing including back plate 12 and outer cover 13 is fitted over the outer end of boiler mounting tube 1 to which a sleeve or collar 14 is brazed or tack-welded for securing the same to back plate 12 by machine screws 15. A pressure sensitive switch 16 is mounted on back plate 12 by means of screws 17 and an insulating mounting block 18 which positions the switch 16 so that its spring-loaded operating lever 19 is normally restrained from movement by the periphery of knob 9, see Fig. 3.

Referring now to Fig. 2 which indicates the position of the control apparatus under abnormal conditions when the water-level has fallen below the mounting tube 1, the fusible material 10 melts, thus freeing the inner end of rod 8. Spring 11 is thus free to expand and force knob 9 and attached rod 8 outwardly until the conical portion 8b of rod 8 strikes the beveled seat 3' of the tube nut 3 to provide a tight joint to prevent the escape of water from the boiler. As knob 9 is forced outwardly, the operating lever 19 moves toward the axis of rod 8 a sufficient distance to actuate switch 16.

As shown in Fig. 1, the boiler firing apparatus 23 is electrically energized from voltage source 24, 25 over the following path: energy flows from line 24 over a lead 26 to switch 16, which is of single-pole, double-throw type, through the normally-closed pair of contacts within switch 16 to lead 27 and apparatus 23, and returns over lead 28 to the opposite line 25. When switch 16 is actuated the normally-closed contacts open and the resulting open-circuit between leads 26 and 27 deenergizes the boiler firing apparatus. Switch 16 is further provided with a normally-open contact to which a lead 29 is attached. When switch 16 is actuated, this normally-open contact closes to provide a closed circuit between leads 29 and 26. Lead 29 is connected to a safety alarm signal 30 of the audible or visible type. Alarm 30 is provided with an energy return path over a lead 31 to the line 25. The complete energy flow for the alarm circuit, when switch 16 is actuated, thus is seen to follow a path from line 24 over lead 26, through a switch 16, from switch 16 over lead 29 to alarm 30, and from alarm 30 back over lead 31 to the opposite line 25.

On actuation of the safety control apparatus in response to a low water condition, the boiler attendant adds water to the boiler, removes the assembly 2—11, and inserts a new one. To do this he must reset the switch 16 by pressing the operating lever 19 to the left, Fig. 3, to clear the knob 9 of the new control assembly.

Figure 4:
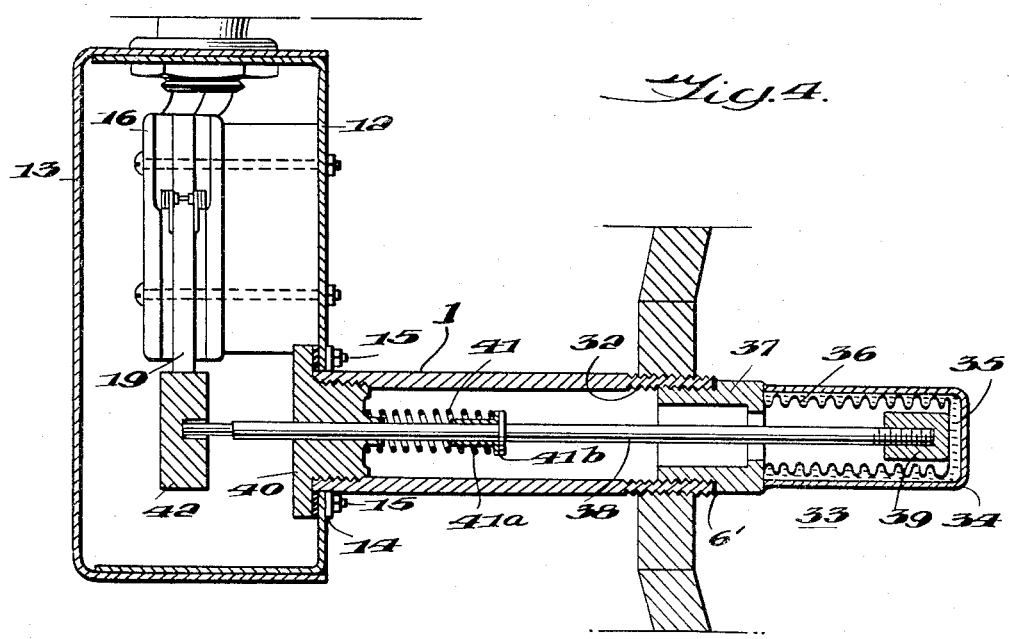
Fig. 4 is a sectional view of another embodiment of the apparatus of this invention.

Fig. 4 illustrates an alternative embodiment of the apparatus of this invention. The arrangement is similar to that shown in the preceding figures, but differs in the details of the heat-responsive member and its cooperating linkage which controls switch 16. In this embodiment the boiler mounting tube 1 is provided with internal threads 32 at the inner end for the mounting of a heat-responsive assembly indicated generally by reference numeral 33, which includes an expansion element of the liquid-filled bellows type. A tubular casing 34 with a closed end in contact with the boiler water contains a suitable liquid 35, having a boiling point as desired within the range of 300° to 450° F., which is sealed within casing 34 by a bellows 36 and a gland nut 37 which is adapted to engage threads 32 for mounting the expansion chamber on the tube 1. A gasket 6' insures a liquid tight seal between the nut 37 and the mounting tube 1. An actuating rod or shaft 38 having an enlarged head 39 at its inner end in contact with the movable wall of the bellows is slidable axially of tube 1 by its mounting in the bore of a tube nut 40 which closes the outer end of the boiler mounting tube 1, and is urged inwardly by a spring 41 which is seated between the nut 40 and a sleeve 41a contacting a split collar 41b engaged in a circumferential groove of rod 38. A knob 42 is arranged on the outer end of rod 38 with a slip fit and blocks movement of the switch operating lever 19.

When the water-level falls below the tubular casing 34 the liquid 35 expands and/or vaporizes, thus moving the bellows wall which forces rod 38 outwardly while compressing spring 41. Knob 42 is forced outwardly by rod 38 and thus allows the operating lever 19 to move toward the axis of rod 38 a sufficient distance to actuate switch 16. In the manner previously described, switch 16, when actuated, cuts off the boiler firing apparatus 23 and operates the alarm 30.

After adding water to the boiler, the liquid 35 cools down and the bellows wall returns to its normal position, aided by spring 41. The spring also moves rod 38 inwardly to its normal position; however, since the knob 42 has only a loose fit upon the rod, the lever 19 for switch 16 will rest behind the inner face of knob 42 and automatically slip the latter from the rod. In order to recycle this embodiment of the safety control apparatus it is necessary to manually remove outer cover 13 of the switch housing, push the lever 19 back into its normal position, and then replace knob 42 on rod 38 to hold lever 19 in reset position.

Figure 5:
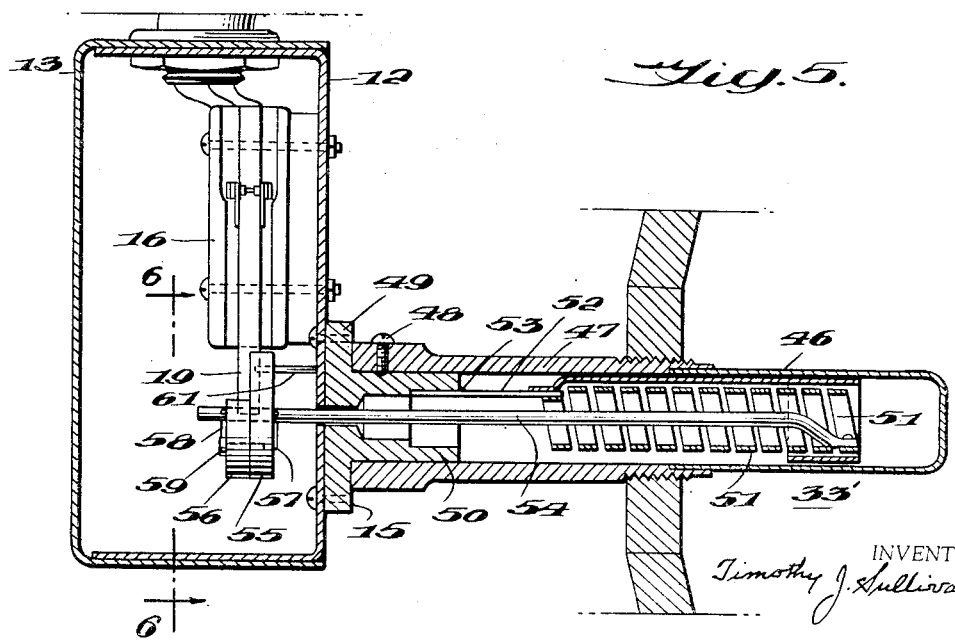
Fig. 5 is a sectional view of a third embodiment.

Fig. 5 illustrates a further embodiment of the apparatus wherein the expansible heat-responsive assembly 33' utilizes a helical bimetal strip. A tubular casing 46 with a closed end in contact with the boiler water is secured in a liquid tight fashion to the inner end of the boiler mounting tube 47, while the outer end of the latter is held by a set-screw 48 over a tubular extension 50 on the inner face of collar 49. Back plate 12 of the switch housing is fastened to collar 49 by means of machine screws 15. The bimetal strip 51 is secured against rotation of its outer end by brazing it to a mounting 52 which is brazed to collar extension 50 by solder or weld metal 53. The inner end of the bimetal strip is pinned to the rod or shaft 54 which extends axially through collar 49 into the switch housing. A two-part split knob 55, 56 has a slip fit on rod 54, and is held in operative relation with switch lever 19 by means of pins 57 and 58 which have a friction fit in transverse openings through rod 54.

Figure 6A:
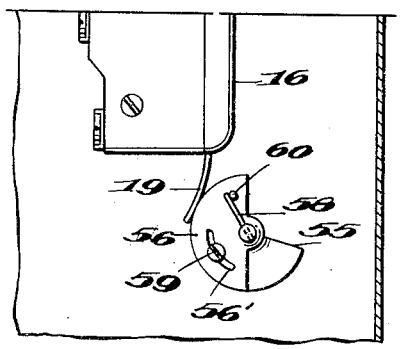
Figs. 6A and 6B are fragmentary sectional views, on an enlarged scale, taken along line 6—6 of Fig. 5.

Referring now to Fig. 6A which shows the normal "boiler on" position, both parts of the split knob engage the operating lever 19 of switch 16 to retain the switch in normal reset condition. The parts are of cam shape and angularly adjustable with respect to each other to determine the angular extent of their larger radius portions and thereby the particular temperature for actuation of switch 16, and may be secured in desired adjusted position by a screw 59 which passes through an arcuate slot 56' in knob part 56 and is threaded into part 55.

Figure 6B:
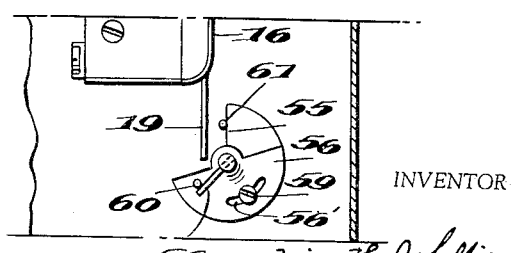

The pin 58 contacts a pin 60 set into the knob part 56 on the proper side for rotation of the split knob 55, 56 clockwise on an increase in the temperature of the bimetallic helix 51 and, when the latter reaches the preselected danger temperature, the knob has been rotated from normal position as shown in Fig. 6A into the alarm position of Fig. 6B at which the smaller radius portions of elements 55, 56 are opposite the actuating lever 19, thus permitting it to actuate switch 16.

On supplying water to the boiler, the bimetallic helix 51 cools down and rotates the rod 54 counterclockwise but the two part knob 55, 56 can not follow this movement since it is loosely mounted upon the rod and the pin 58 is positioned on the wrong side of the pin 60. To reset the control, the attendant must open the housing, push lever 19 to the left and turn the knob 55, 56 counterclockwise until the larger radius portion of the element 56 strikes stop pin 61, thus positioning both knob sections in the path of the switch operating lever 19.

While various arrangements have been proposed for the control of electrical circuits to de-energize a heating system in the event of abnormally high temperature, I believe it to be broadly new to provide a safety control system which requires no change in the electrical connections to restore normal operating conditions after an operation of the safety system.

While the controlled element 23 of Fig. 1 is shown schematically as a motor-driven gun for forcing air and oil into the furnace chamber, it is obvious that the controlled element which is de-energized by the control system could be an electromagnetic valve in the oil or gas line supplying fuel to the boiler.

I claim:

1. The combination with a boiler having electrically energized means for heating the same, and a permanently connected electrical network for supplying power to said electrically-energized means, said network including a switch with an operating lever biased for movement to open said switch to de-energize said electrically-energized means; of an over-temperature safety control comprising a fusible plug means for supporting said fusible plug on said boiler in position to be subject to over-heating within the same, said supporting means comprising a mounting tube with an open inner end mounted in said boiler, a linkage connected at one end to said fusible plug and carrying at its opposite end a knob positioned to engage and block movement of said switch operating lever, said mounting tube having an apertured closure at its outer end to support the outer end of said linkage, means operative upon heating of said fusible plug to a preselected temperature to move said linkage to displace said knob from blocking engagement with said switch operating lever, said tube and linkage having cooperative elements constituting valve means to seal said aperture in the outer end of said tube on movement of said linkage to displace said knob from said blocking engagement.

2. The combination as recited in claim 1, wherein said electrical network includes an alarm circuit, and said switch closes the alarm circuit upon movement of said operating lever to open the switch to de-energize said electrically-energized means.

3. The combination as recited in claim 1, wherein said over-temperature safety control comprises a tubular member having a plug of fusible alloy closing its inner end and an axially bored mounting nut at its outer end, said mounting nut constituting said closure of said mounting tube, said linkage comprises a rod slidable in the bore of said mounting nut and having its inner end embedded in said fusible alloy plug, and said means for moving said linkage comprises a spring surrounding said rod and compressed between said knob and said mounting nut.

4. The combination as recited in claim 3, wherein said mounting tube is internally threaded at its outer end to receive the mounting nut of said heat-responsive member.

5. The combination as recited in claim 4, and wherein said rod and the inner face of said mounting nut have complementary conical surfaces which engage, upon movement of said rod by said spring on fusion of said plug, to constitute said valve means.

References Cited in the file of this patent

UNITED STATES PATENTS

| | | |
|---|---|---|
| 1,055,882 | Cubitt | Mar. 11, 1913 |
| 1,117,039 | Halverson | Nov. 10, 1914 |
| 1,533,282 | Thornton | Apr. 14, 1925 |
| 1,734,609 | Andrews | Nov. 5, 1929 |
| 1,907,845 | Macrae et al. | May 9, 1933 |